United States Patent
Peng et al.

(10) Patent No.: US 9,316,871 B2
(45) Date of Patent: Apr. 19, 2016

(54) LIQUID CRYSTAL DISPLAY AND METHOD FOR FABRICATING THE SAME

(75) Inventors: Cheng-Chung Peng, Chu-Nan (TW); Shih-Hung Fan, Chu-Nan (TW)

(73) Assignees: INNOLUX CORPORATION, Jhu-Nan (TW); INNOCOM TECHNOLOGY (SHENZHEN) CO., LTD., Shenzhen (CN)

( * ) Notice: Subject to any disclaimer, the term of this patent is extended or adjusted under 35 U.S.C. 154(b) by 245 days.

(21) Appl. No.: 13/615,187

(22) Filed: Sep. 13, 2012

(65) Prior Publication Data

US 2013/0148065 A1    Jun. 13, 2013

(30) Foreign Application Priority Data

Dec. 9, 2011   (TW) .............................. 100145511 A

(51) Int. Cl.
| | |
|---|---|
| *G02F 1/1337* | (2006.01) |
| *G02F 1/1333* | (2006.01) |
| *G02F 1/1343* | (2006.01) |
| *G02F 1/137* | (2006.01) |

(52) U.S. Cl.
CPC .... *G02F 1/134309* (2013.01); *G02F 1/133711* (2013.01); *G02F 1/133753* (2013.01); *G02F 2001/13712* (2013.01); *G02F 2001/133715* (2013.01); *G02F 2001/133757* (2013.01); *G02F 2001/134372* (2013.01); *G02F 2202/06* (2013.01)

(58) Field of Classification Search
CPC .................. G02F 1/133711; G02F 1/133753; G02F 1/134309; G02F 2202/06; G02F 2001/13357; G02F 2001/134372; G02F 2001/13712; G02F 2001/133715

USPC ......... 349/123, 124, 129, 139, 143, 175, 179, 349/187; 430/321; 445/24
See application file for complete search history.

(56) References Cited

U.S. PATENT DOCUMENTS

| | | | |
|---|---|---|---|
| 5,307,189 A * | 4/1994 | Nishiki et al. | 349/143 |
| 5,309,264 A * | 5/1994 | Lien et al. | 349/143 |
| 5,416,619 A * | 5/1995 | Koike | 349/42 |
| 5,963,290 A * | 10/1999 | Murai et al. | 349/191 |
| 6,057,902 A * | 5/2000 | Angelopoulos et al. | 349/129 |
| 6,201,588 B1 * | 3/2001 | Walton et al. | 349/123 |
| 6,778,229 B2 * | 8/2004 | Inoue et al. | 349/39 |
| 6,982,774 B1 * | 1/2006 | Nomura et al. | 349/129 |
| 2011/0164206 A1 * | 7/2011 | Fan et al. | 349/96 |
| 2011/0199550 A1 * | 8/2011 | Fan et al. | 349/33 |

FOREIGN PATENT DOCUMENTS

| | | |
|---|---|---|
| CN | 1575435 | 2/2005 |
| JP | H10177174 | 6/1998 |
| TW | 542934 | 7/2003 |

* cited by examiner

*Primary Examiner* — Dung Nguyen
*Assistant Examiner* — Tai Duong
(74) *Attorney, Agent, or Firm* — Liu & Liu

(57) ABSTRACT

The invention provides a liquid crystal display, including: a substrate, wherein the substrate includes a first flat electrode formed thereon; a first alignment layer formed on the first flat electrode; a second substrate disposed oppositely to the first substrate, wherein the second substrate includes a gate line, a data line and a second flat electrode, wherein the gate line intersects with the data line to define a pixel region, the pixel region includes at least one sub-pixel electrode region, and an area of the second flat electrode is smaller than that of the first flat electrode; a second alignment layer formed on the second flat electrode; and a liquid crystal layer formed between the first substrate and the second substrate, wherein the liquid crystal layer has chirality, wherein the sub-pixel electrode region has a multidomain pretilt angle.

19 Claims, 22 Drawing Sheets

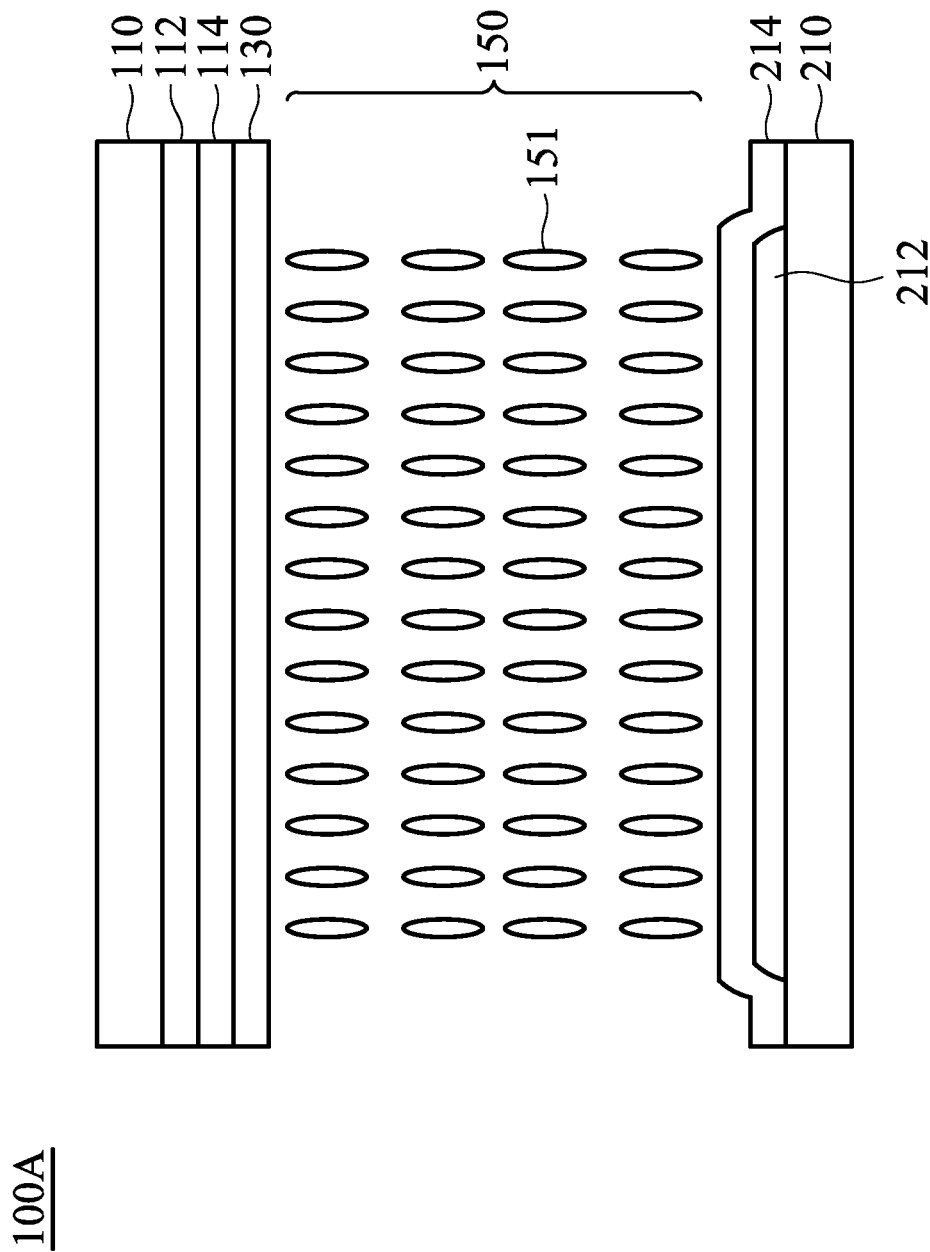

LIQUID CRYSTAL DISPLAY AND METHOD FOR FABRICATING THE SAME

CROSS REFERENCE TO RELATED APPLICATIONS

This Application claims priority of Taiwan Patent Application No. 100145511, filed on Dec. 9, 2011, the entirety of which is incorporated by reference herein.

BACKGROUND OF THE DISCLOSURE

1. Field of the Disclosure

The present disclosure relates to a liquid crystal display, and in particular relates to a liquid crystal display having a multi-domain alignment structure and method for fabricating the same.

2. Description of the Related Art

Liquid crystal displays (LCD) are widely used in personal computers, personal digital assistants (PDA), mobile phones or TVs, because they are light, have low power consumption and no radiation.

The liquid crystal display includes a thin film transistor (TFT) substrate and a color filter (CF) substrate facing each other with a liquid crystal layer interposed therebetween. In a mono-domain alignment LCD, an alignment layer is formed on the substrate by a rubbing alignment method, so that the liquid crystal molecules are aligned in a single direction. In order to improve the viewing angle of a LCD, a multi-domain alignment LCD has been developed.

The multi-domain alignment is formed by a micro-rubbing method, a stacked alignment layer, or an auxiliary alignment device (such as a protrusion or a specific etched electrode).

However, loss of transmission, low aperture ratio, color washout and grayscale inversion issues may be raised by the above alignment method. Therefore, there is a need to develop a liquid crystal display having a multi-domain alignment structure and method for fabricating the same to solve the above-mentioned problems. The liquid crystal display is not fabricated by the conventional rubbing alignment method and the auxiliary alignment device is not needed.

BRIEF SUMMARY OF THE DISCLOSURE

The invention provides a liquid crystal display, comprising: a substrate, wherein the substrate comprises a first flat electrode formed thereon; a first alignment layer formed on the first flat electrode; a second substrate disposed oppositely to the first substrate, wherein the second substrate comprises a gate line, a data line and a second flat electrode, wherein the gate line intersects with the data line to define a pixel region, the pixel region comprises at least one sub-pixel electrode region, and an area of the second flat electrode is smaller than that of the first flat electrode; a second alignment layer formed on the second flat electrode; and a liquid crystal layer formed between the first substrate and the second substrate, wherein the liquid crystal layer has chirality, wherein the sub-pixel electrode region has a multidomain pretilt angle.

The invention also provides a method for fabricating a liquid crystal display, comprising: providing a first substrate and a second substrate, wherein the first substrate and the second substrate are disposed oppositely to each other; forming a first flat electrode on the first substrate; forming a first alignment layer on the first flat electrode; forming a gate line, a data line and a second flat electrode on the second substrate, wherein the gate line intersects with the data line to define a pixel region, the pixel region comprises at least one sub-pixel electrode region, and an area of the second flat electrode is smaller than that of the first flat electrode; forming a second alignment layer on the second flat electrode; assembling the first substrate and the second substrate; forming a liquid crystal layer between the first substrate and the second substrate, wherein the liquid crystal layer has chirality; performing a first irradiation to a first region of the sub-pixel electrode region; applying a first voltage to the sub-pixel electrode region; performing a second irradiation to the sub-pixel electrode region; and removing the first voltage, wherein the sub-pixel electrode region has a multidomain pretilt angle, and the liquid crystal layer in the sub-pixel electrode region has a continuous domain alignment.

A detailed description is given in the following embodiments with reference to the accompanying drawings.

BRIEF DESCRIPTION OF THE DRAWING

For a more complete understanding of the present disclosure, and the advantages thereof, reference is now made to the following descriptions taken in conjunction with the accompanying drawings, in which:

FIG. 10 shows a cross-sectional schematic representation of a liquid crystal device in accordance with another embodiment of the invention.

DETAILED DESCRIPTION OF THE DISCLOSURE

The following description is the best-contemplated mode of carrying out the disclosure. This description is made for the purpose of illustrating the general principles of the disclosure and should not be taken in a limiting sense. The scope of the disclosure is best determined by reference to the appended claims.

Figure 1:
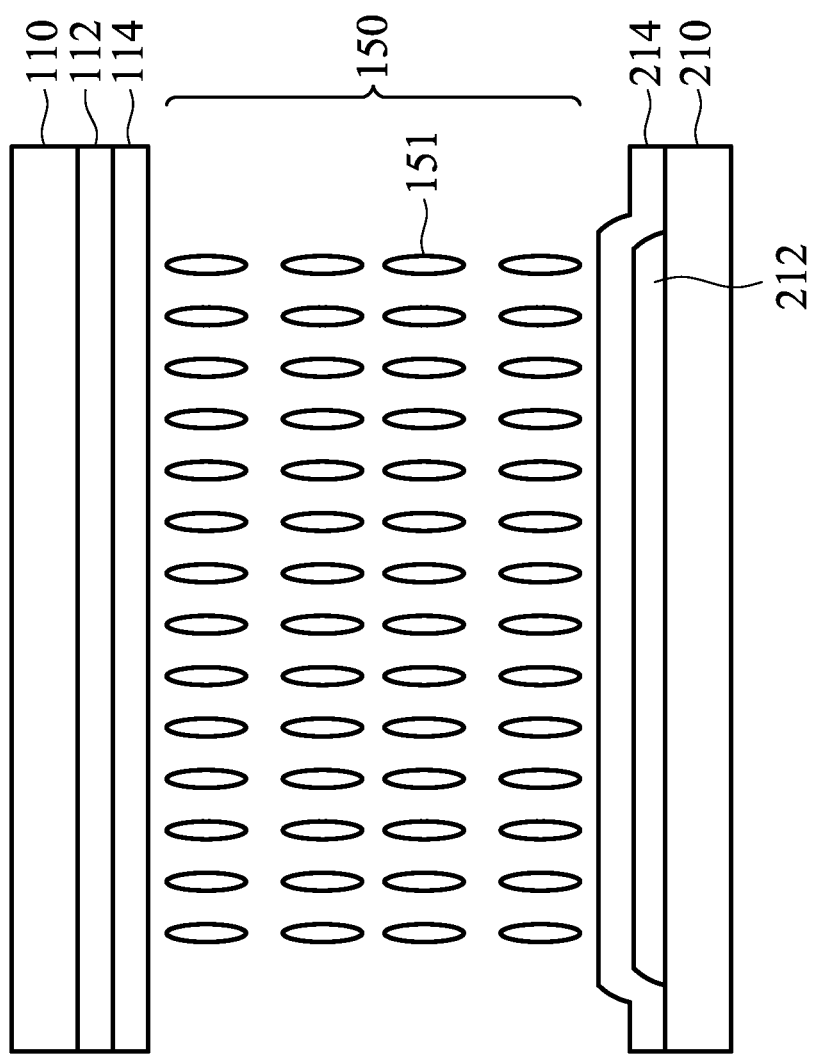
FIG. 1 shows a cross-sectional schematic representation of a liquid crystal device in accordance with an embodiment of the invention.
Figure 2:
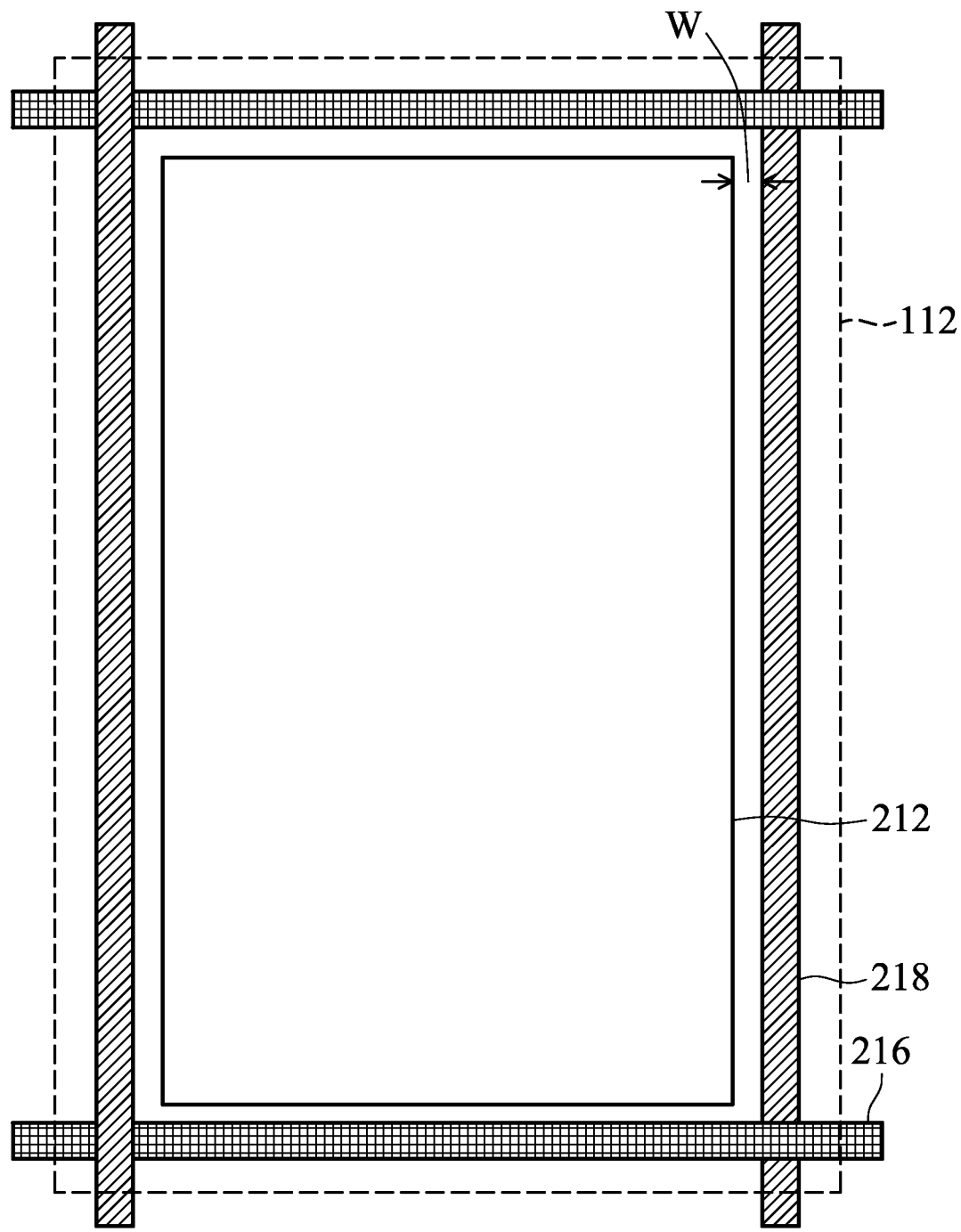
FIG. 2 shows a top-view schematic representation of the liquid crystal device in accordance with an embodiment of the invention.

FIG. 1 shows a cross-sectional schematic representation of a liquid crystal device 100 in accordance with an embodiment of the invention, and FIG. 2 shows a top-view schematic representation of the liquid crystal device 100.

The liquid crystal device 100 comprises a first substrate 110 and a second substrate oppositely disposed thereto, and a liquid crystal layer 150 is formed between the first substrate 110 and the second substrate 210. A first flat electrode 112 and a first alignment layer 114 are sequentially formed on the first substrate 110, and a second flat electrode 212 and a second alignment layer 214 are sequentially formed on the second substrate 210. The liquid crystal layer 150 has chirality; because that comprises a mixture of the nematic liquid crystal molecules 151 and chiral molecules, or the cholesteric liquid crystal molecules. As shown in FIG. 1, an area of the second flat electrode 212 is smaller than that of the first flat electrode 112.

In one embodiment, the first substrate 110 is a color filter substrate and the second substrate 210 is a thin film transistor (TFT) substrate. The liquid crystal layer 150 is preferably made by a mixture of the nematic liquid crystal molecules with negative dielectric anisotropy and chiral molecules.

Referring to FIG. 2, a gate line 216 and a data line 218 are formed on the second substrate 210, and the gate line 216 intersects with the data line 218 to define a pixel region. The pixel region may be a red pixel region, green pixel region or blue pixel region.

Figure 4:
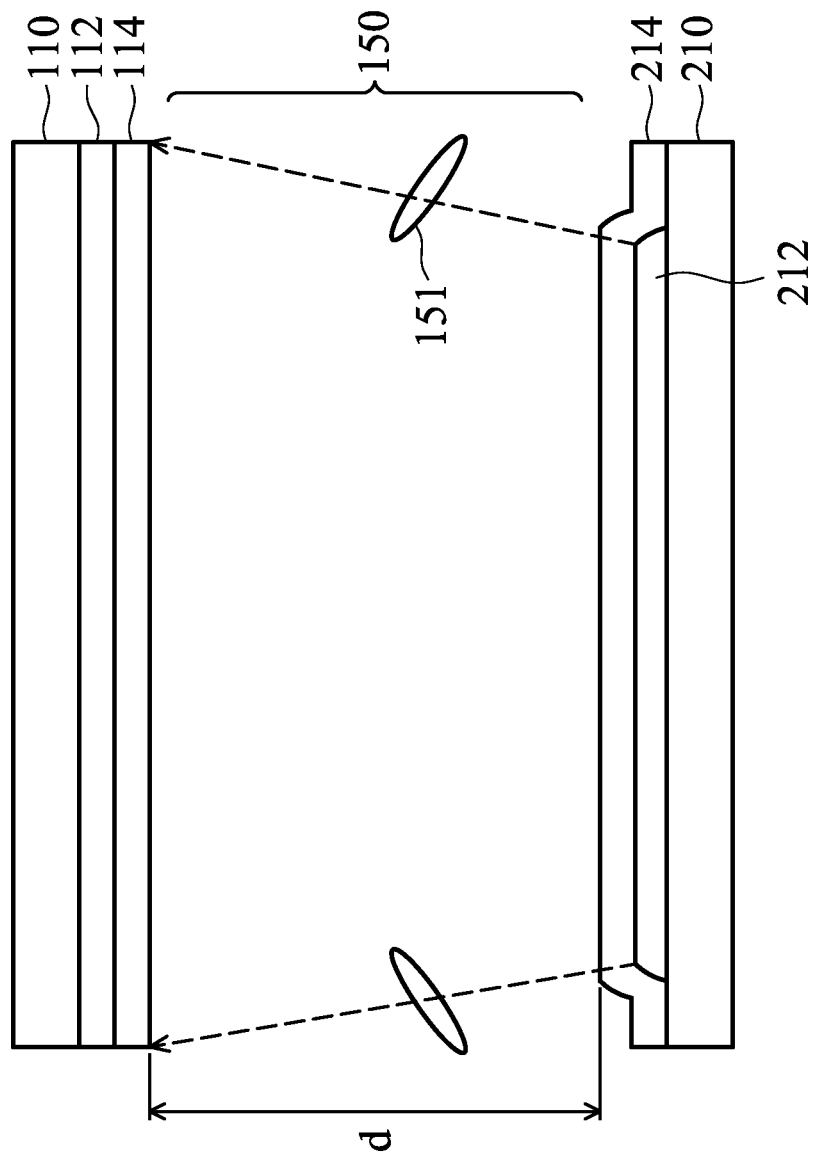
FIG. 4 shows a cross-sectional schematic representation of alignment of the liquid crystal molecules effected by an oblique field effect.

Additionally, as shown in FIG. 2, a distance W between a borderline of the pixel region and a borderline of the second flat electrode 212 is larger than or equal to a thickness of the liquid crystal layer 150 (the thickness of the liquid crystal layer 150 is shown in FIG. 4).

In another embodiment, the pixel region comprises at least one sub-pixel electrode region. FIG. 2 and FIG. 3A-3D show the various embodiments of the first flat electrode 112, the second flat electrode 212 and sub-pixel electrode region according to the invention.

Figure 3A:
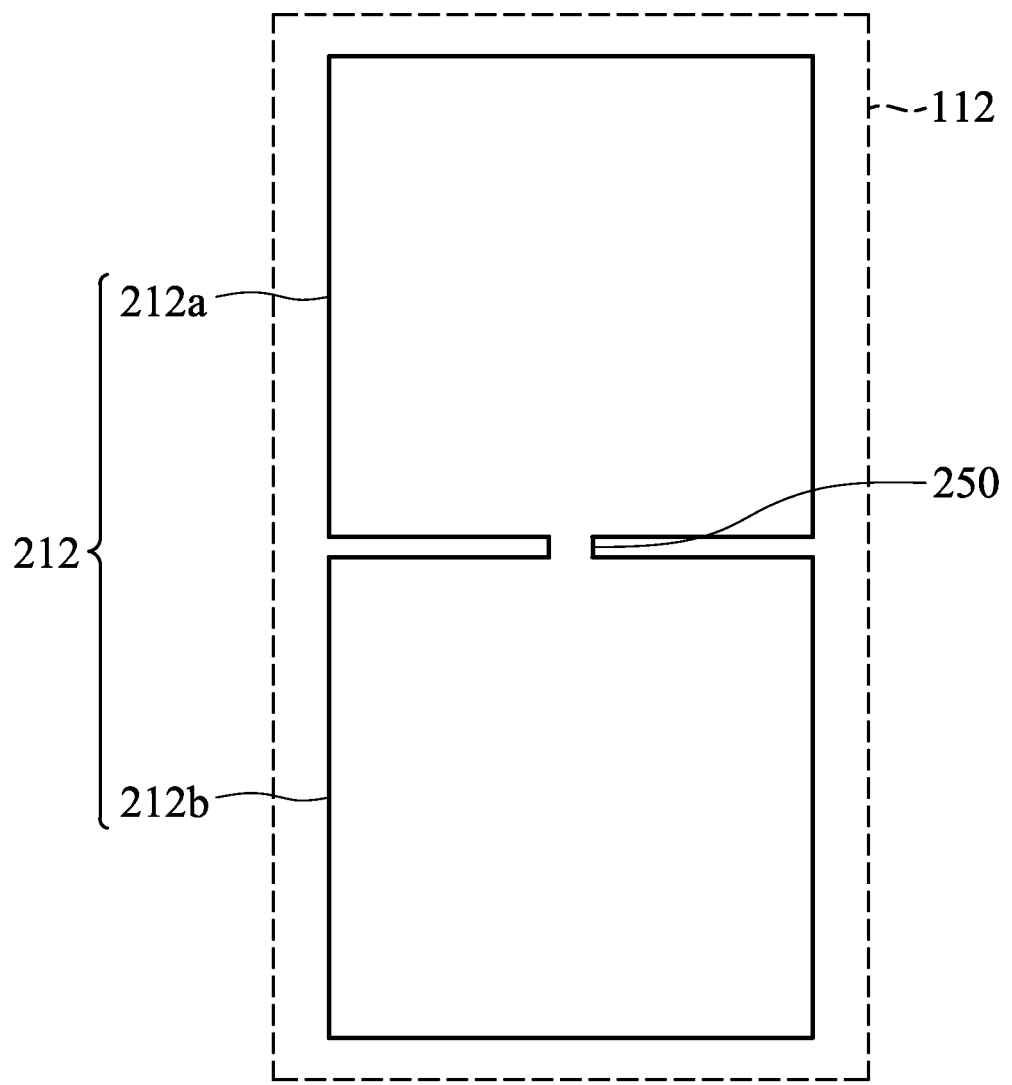
FIGS. 3A-3D show the various embodiments of the first flat electrode, the second flat electrode and sub-pixel electrode region according to the invention.

In FIG. 3A, an area of the second flat electrode 212 is smaller than that of the first flat electrode 112. The second flat electrode 212 comprises a first sub-pixel electrode region 212a and a second sub-pixel electrode region 212b. The first sub-pixel electrode region 212a is electrically connected to the second sub-pixel electrode region 212b by a connecting electrode 250 (the connecting electrode 250 and the second flat electrode 212 are at the same layer).

Figure 3B:
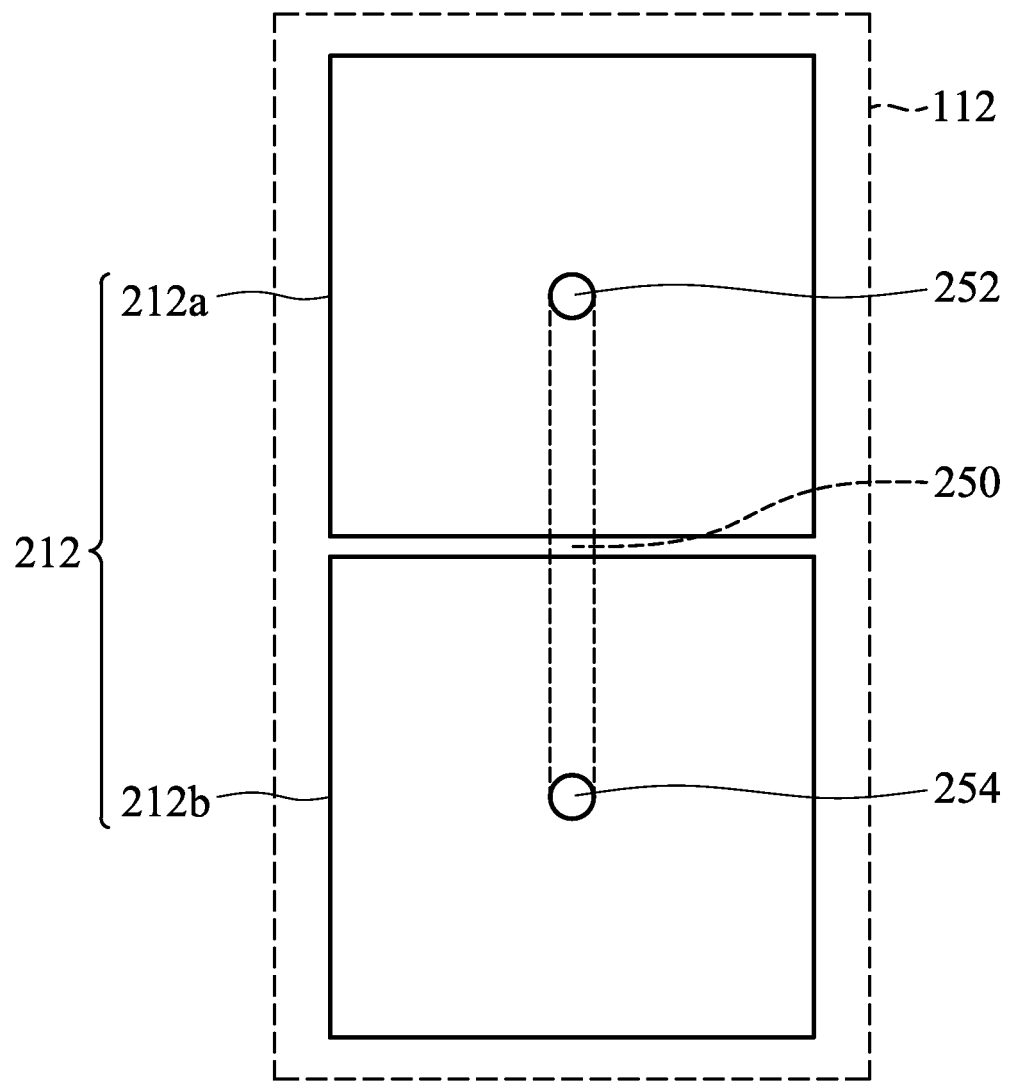

Referring to FIG. 3B, an area of the second flat electrode 212 is smaller than that of the first flat electrode 112. The second flat electrode 212 comprises a first sub-pixel electrode region 212a and a second sub-pixel electrode region 212b. A connecting electrode 250 and the first sub-pixel electrode region 212a (and a second sub-pixel electrode region 212b) are formed on different layers. The first sub-pixel electrode region 212a is electrically connected to the connecting electrode 250 by a first via 252, and the second sub-pixel electrode region 212b is electrically connected to the connecting electrode 250 by a second via 254.

Figure 3C:
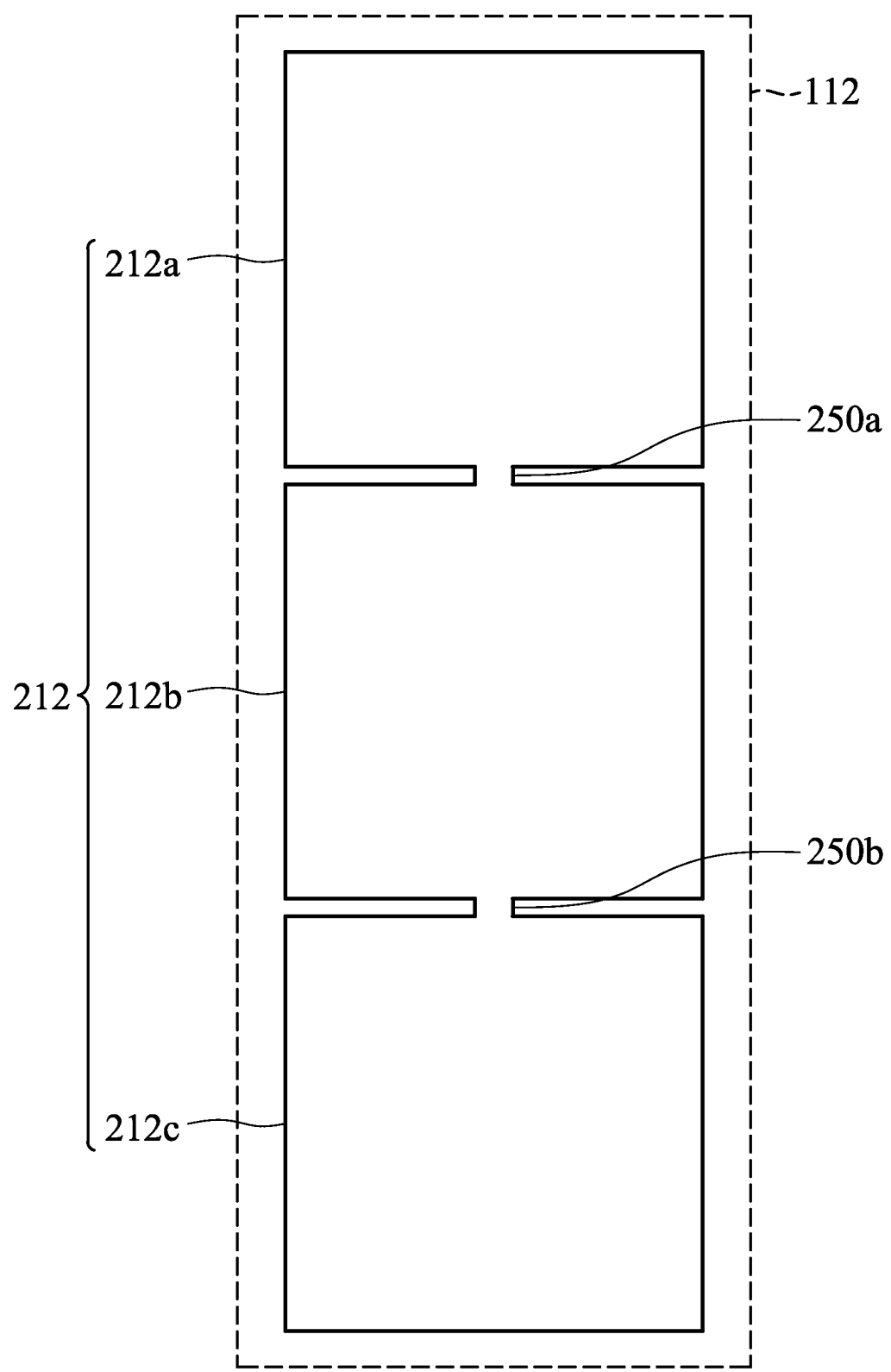

Referring to FIG. 3C, an area of the second flat electrode 212 is smaller than that of the first flat electrode 112. The second flat electrode 212 comprises a first sub-pixel electrode region 212a, a second sub-pixel electrode region 212b and a third sub-pixel electrode region 212c. The first sub-pixel electrode region 212a is electrically connected to the second sub-pixel electrode region 212b by a first connecting electrode 250a (the first connecting electrode 250a and the second flat electrode 212 are at the same layer). The second sub-pixel electrode region 212b is electrically connected to the third sub-pixel electrode region 212c by a second connecting electrode 250b (the second connecting electrode 250b and the second flat electrode 212 are at the same layer).

Figure 3D:
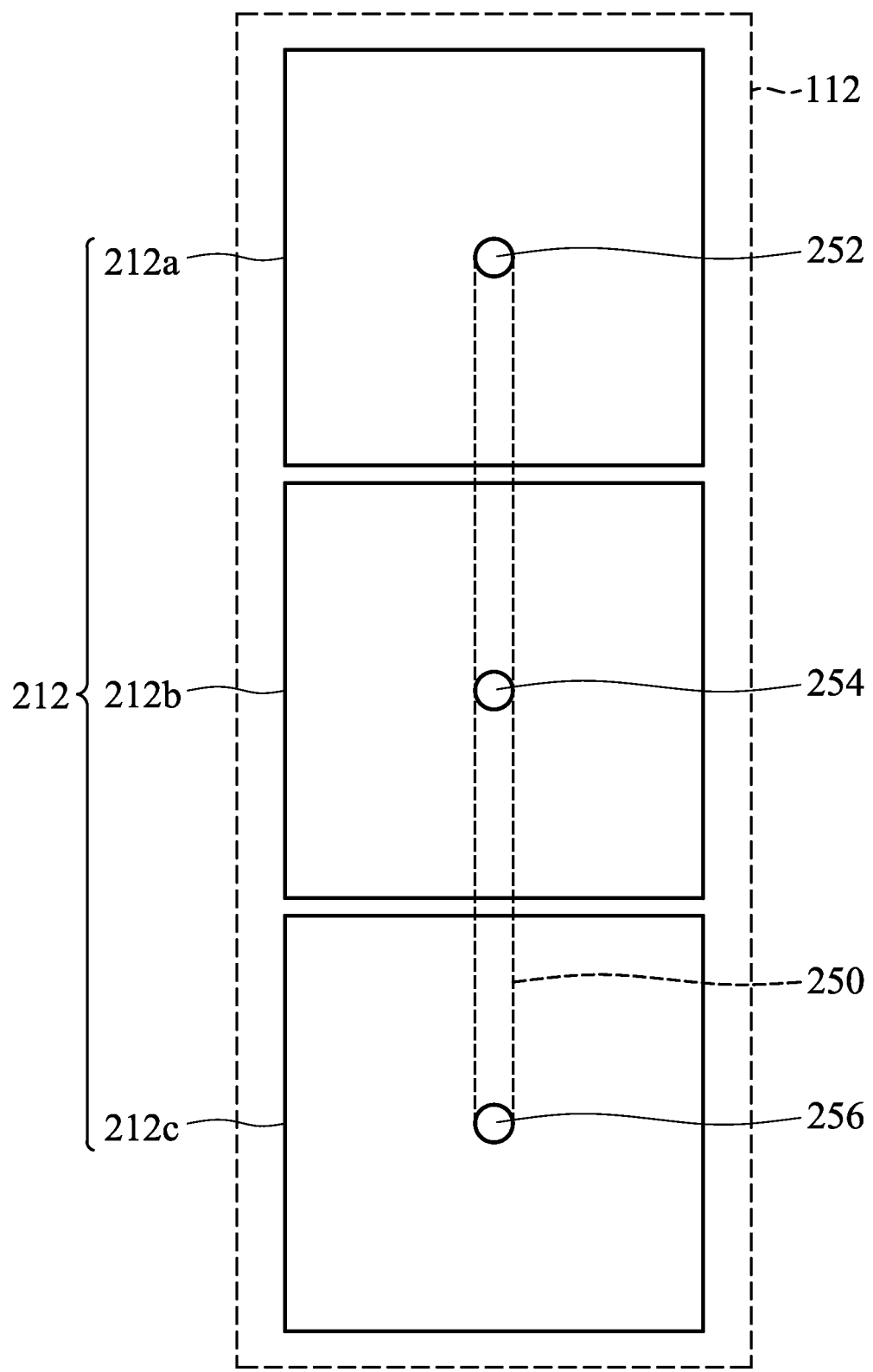

Referring to FIG. 3D, an area of the second flat electrode 212 is smaller than that of the first flat electrode 112. The second flat electrode 212 comprises a first sub-pixel electrode region 212a, a second sub-pixel electrode region 212b and a third sub-pixel electrode region 212c. A connecting electrode 250 and the first sub-pixel electrode region 212a and/or a second sub-pixel electrode region 212b are formed on different layers. Thus, a first via 252 (on the first sub-pixel electrode region 212a), a second via 254 (on the second sub-pixel electrode region 212b), a third via 256 (on the third sub-pixel electrode region 212c), and a connecting electrode 250 are formed to electrically connect to the first sub-pixel electrode region 212a, the second sub-pixel electrode region 212b and the third sub-pixel electrode region 212c.

Note that in prior art, the auxiliary alignment device (such as a protrusion or a specific etched electrode) is needed to align the liquid crystal molecules. Compared to the prior art, the first flat electrode 112 and the second flat electrode 212 are both flat electrodes and they are not needed to be etched. As shown in FIG. 4, when the area of the second flat electrode 212 is smaller than that of the first flat electrode 112, and a voltage is applied to the first flat electrode 112 and the second flat electrode 212, the liquid crystal molecules 151 are toppling toward the center of the sub-pixel electrode region (212a, 212b or 212c) by an oblique field effect (the dashed line in FIG. 4). The thickness of the liquid crystal layer 150 is d as shown in FIG. 4.

Additionally, because the chiral molecules are added into the liquid crystal layer 150, and liquid crystal molecules 151 may twist to a right or left direction according to the property of the chiral molecules. When the voltage is applied, the liquid crystal molecules 151 are deformed to form a continuous domain alignment structure. Thus, a wide viewing angle of an LCD is obtained and no singular point is formed in the sub-pixel electrode region.

Figure 5A:
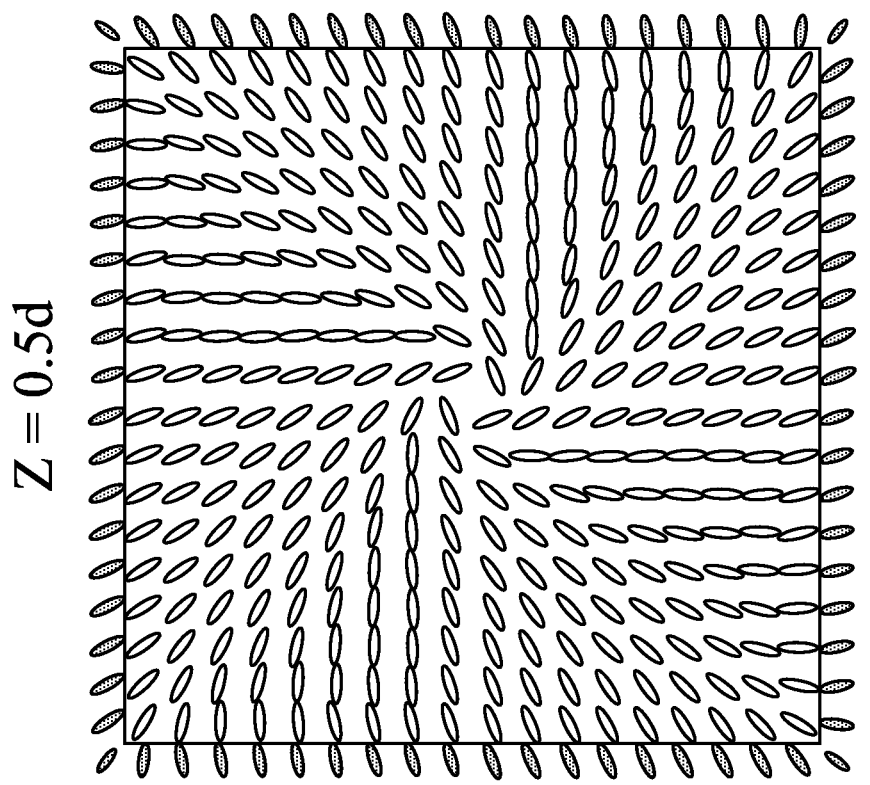
FIGS. 5A-5B are top-views schematic representations of the liquid crystal molecules with an applied voltage.
Figure 5B:
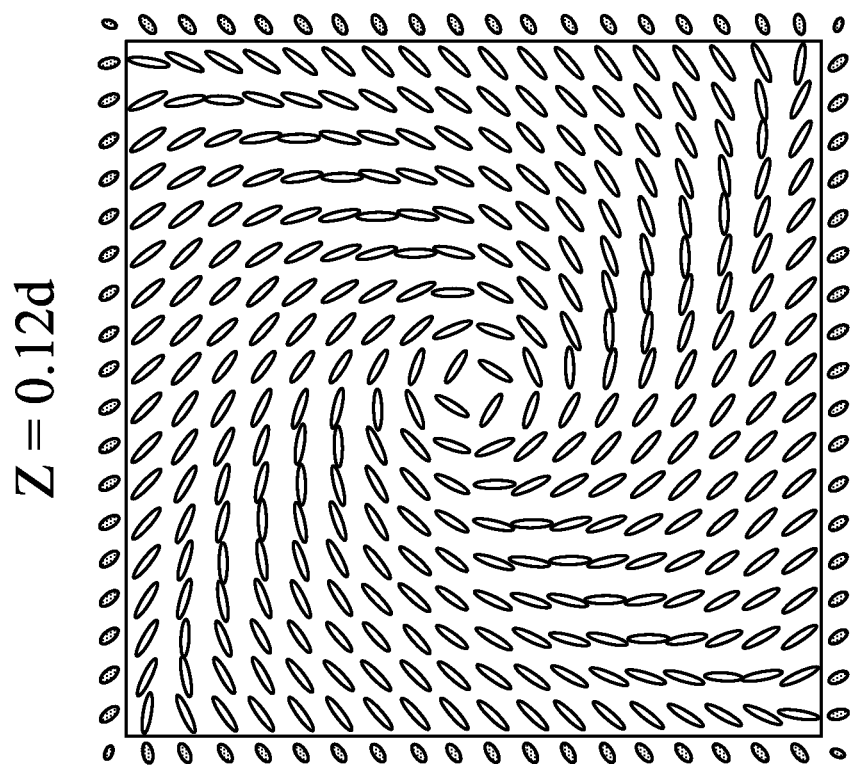
Figure 5C:
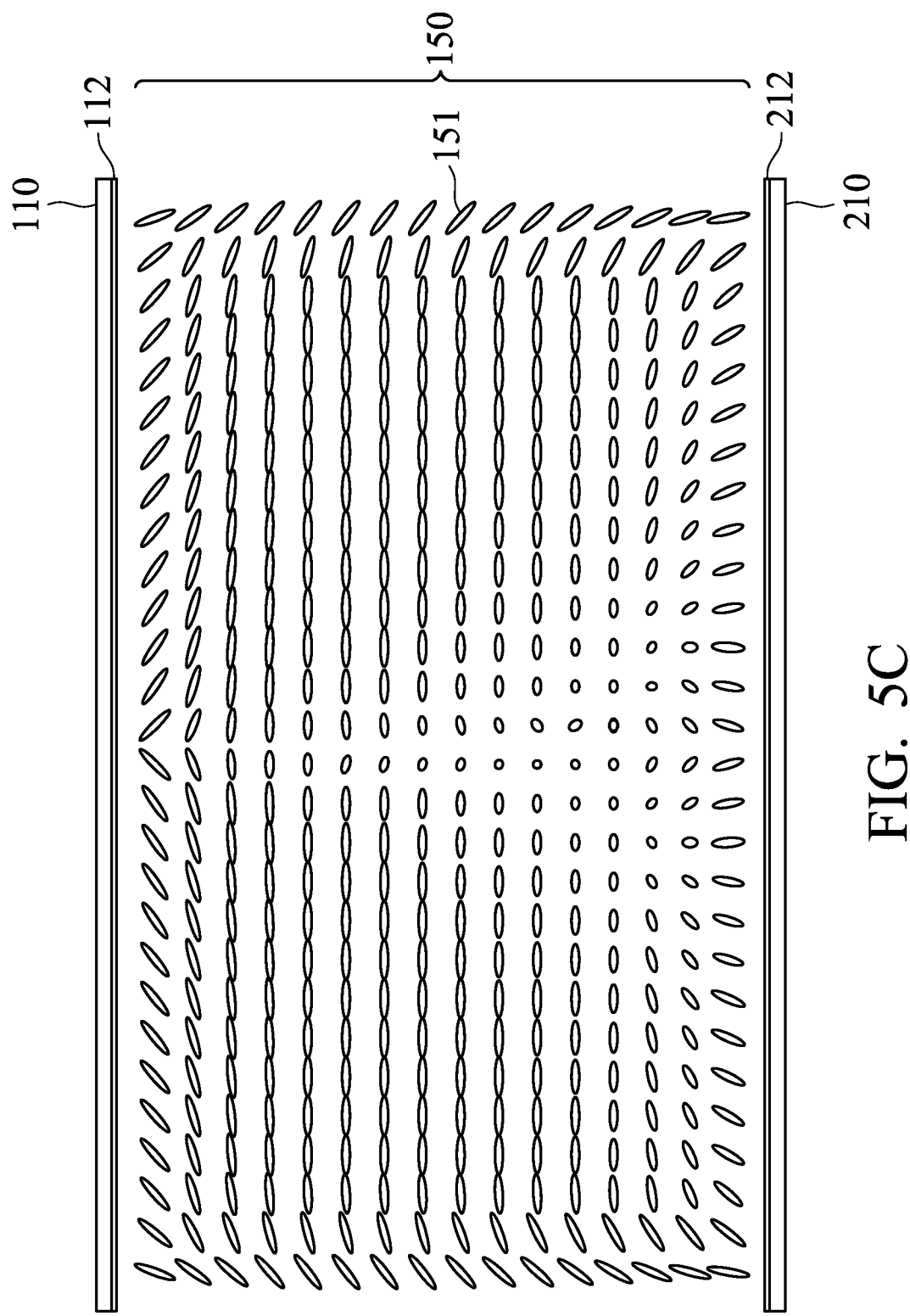
FIG. 5C is a cross-sectional schematic representation of alignment of the liquid crystal molecules with an applied voltage.

Furthermore, the alignment of the liquid crystal molecules 151 is simulated by a finite element method, and the data is shown in FIG. 5A-5C. FIGS. 5A-5B are top-view schematic representations of the alignment of the liquid crystal molecules 151 with an applied voltage, and FIG. 5C shows a cross-sectional schematic representation of the liquid crystal molecules 151. The thickness d of the liquid crystal layer 150 is designed as 4.6 μm.

Referring to FIG. 5A, when the observer location is away from the second alignment layer 214 is 0.5d (at z=0.5d), the alignment of the liquid crystal molecules 151 shows a spiral radially-inclined orientation.

Referring to FIG. 5B, when the observer location is away from the second alignment layer 214 is 0.12d (at z=0.12d), the alignment of the liquid crystal molecules 151 shows concentric circles in the center and radially-inclined orientation in the outer portions.

Referring to FIG. 5C, when a voltage is applied to the liquid crystal molecules 151, the alignment of the liquid crystal molecules 151 is deformed to form a continuous domain alignment.

Figure 11:
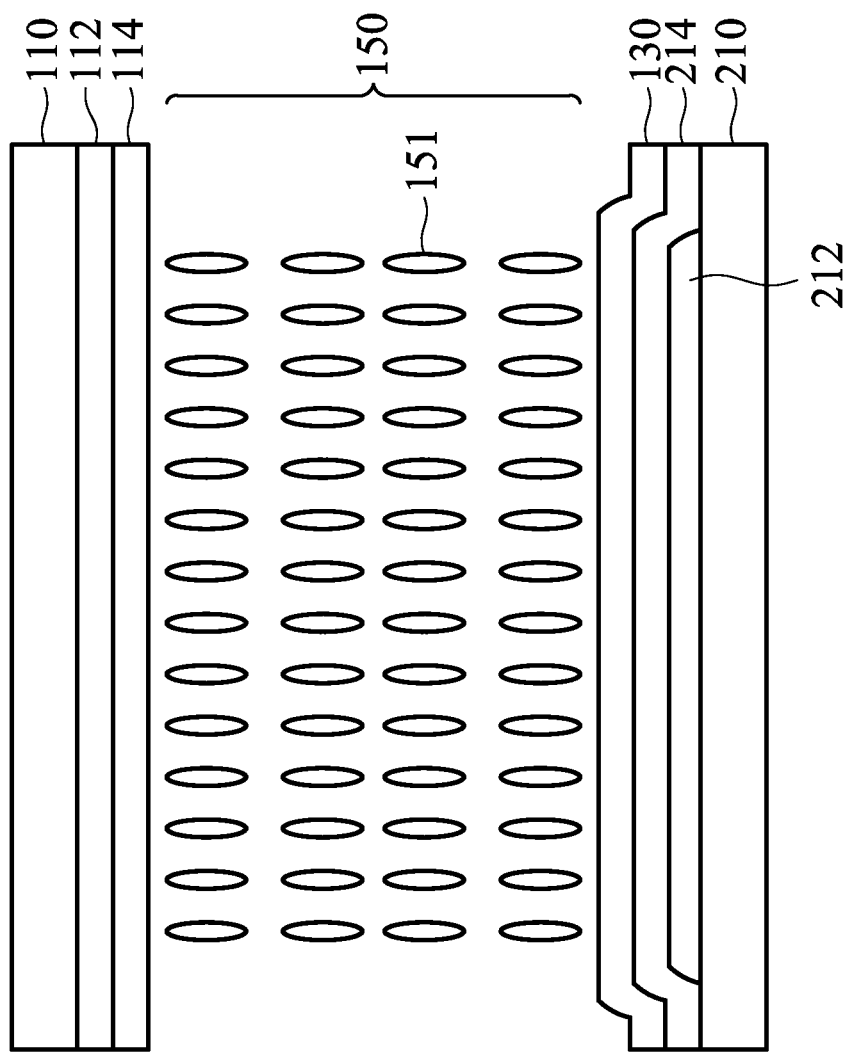
FIG. 11 shows a cross-sectional schematic representation of a liquid crystal device in accordance with a further embodiment of the invention.

When the oblique field effect is used to align the liquid crystal molecules 151 and the applied voltage is large (such as larger than 5 V), the alignment of the liquid crystal molecules 151 is unstable. Thus, the reactive monomers (RM) are added into the liquid crystal layer, and a polymer stable layer which is helpful for the alignment of the liquid crystal molecules 151 is formed by polymerizing the reactive monomers (RM) by irradiation of light. In another embodiment, a liquid crystal device 100A is provided, as shown in FIG. 10. The liquid crystal device 100A shown in FIG. 10 is similar to the liquid crystal device 100 shown in FIG. 1, except that the liquid crystal device 100A comprises a polymer stable layer 130 formed on a portion of the first alignment layer 114. In a further embodiment, a liquid crystal device 100B is provided, as shown in FIG. 11. The liquid crystal device 100B shown in FIG. 11 is similar to the liquid crystal device 100 shown in FIG. 1, except that the liquid crystal device 100B comprises a polymer stable layer 130 formed on a portion of the second alignment layer 214.

Referring to FIG. 1 again, the invention also provides a method for fabricating a liquid crystal device which comprises the following steps. Firstly, the first substrate 110 and the second substrate 210 are provided. The first flat electrode 112 and a first alignment layer 114 are sequentially formed on the first substrate 110, and a second flat electrode 212 and a second alignment layer 214 are sequentially formed on the second substrate 210.

Then, the gate line 216 and the data line 218 (referring to FIG. 2) are formed on the second substrate 210, wherein the gate line 216 intersects with the data line 218 to define a pixel region. The pixel region comprises at least one sub-pixel electrode region (shown in FIG. 2 and FIG. 3A-3D).

Next, the first substrate 110 and the second substrate 210 are assembled and the liquid crystal layer 150 is disposed therebetween. The liquid crystal layer 150 comprises the liquid crystal molecules 151 and chiral molecules.

Figure 6A:
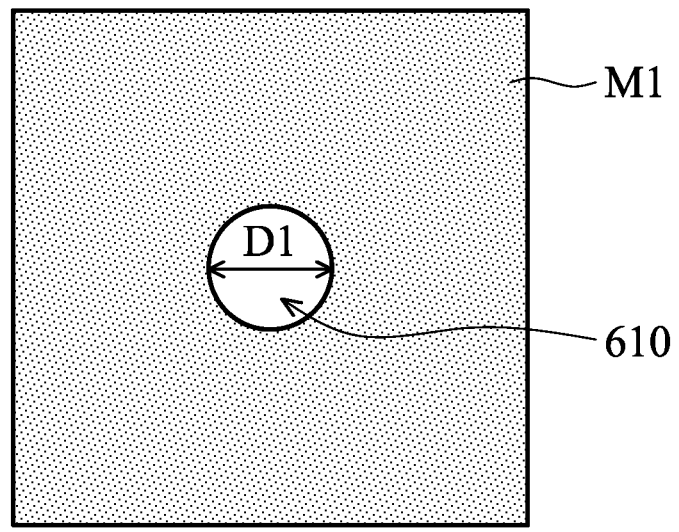
FIGS. 6A-6C show top-view schematic representations of the masks in accordance with an embodiment of the invention.
Figure 6B:
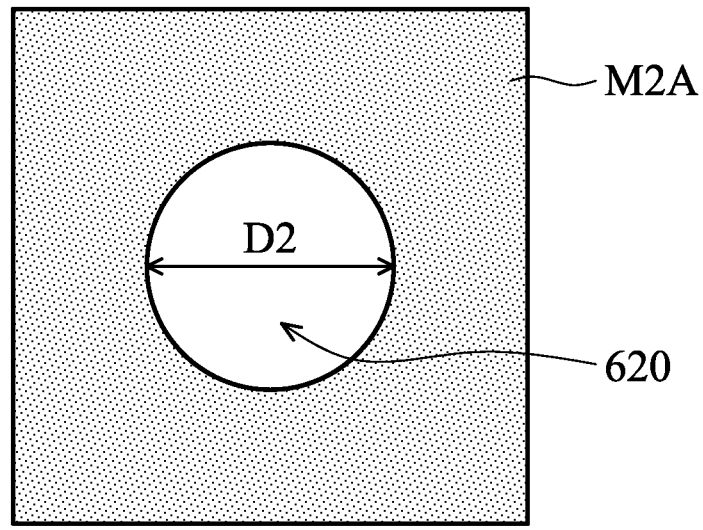
Figure 6C:
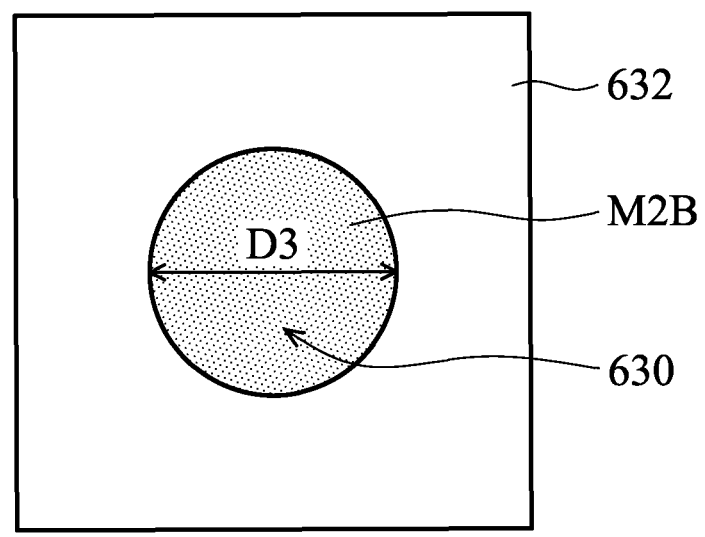

FIGS. 6A-6C show top-view schematic representations of the masks which are needed for the following steps. In FIG. 6A, the first mask has a first opening 610, and the first opening 610 has a diameter of D1.

In FIG. 6B, a second mask M2A has a second opening 620 having a diameter of D2, and D2 is larger than D1.

In FIG. 6C, a third mask M2B has a shielding region 630 and an exposed region 632, and the shielding region 630 has a diameter of D3, and D3 is larger than D1. To simplify the description of the invention, the illustrated mask for polymerization is only used in one sub-pixel electrode region. However, if the pixel region has a plurality of the sub-pixel electrode regions, the mask may have several openings or shielding regions according to the actual numbers of the sub-pixel electrode regions. The openings and shielding regions are preferably corresponding to the center of each of the sub-pixel electrode regions.

The method continues with the following steps. FIGS. 7A-7D show a series of cross-sectional structures illustrating the steps of the fabrication method of a first embodiment. FIGS. 8A-8F show a series of cross-sectional structures illustrating the steps of the fabrication method of a second embodiment. FIGS. 9A-9F show a series of cross-sectional structures illustrating the steps of the fabrication method of a third embodiment. Note that in the first, the second and the third embodiment, the reactive monomers (RM) are added into the first alignment layer 114, the second alignment layer 214, or the liquid crystal layer 150, and thus a polymer stable layer which is helpful for the alignment of the liquid crystal molecules 151 is formed by polymerizing the reactive monomers (RM) by irradiation of light.

Referring to FIG. 7A-7D, after performing a series of steps, a multi-domain pretilt angle is formed in the sub-pixel electrode region.

Figure 7A:
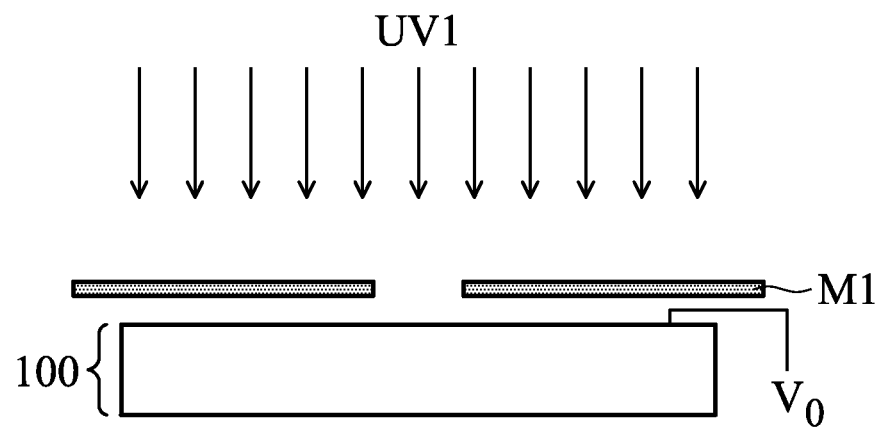
FIGS. 7A-7D show a series of cross-sectional structures illustrating the steps of the fabrication method of a first embodiment.

Firstly, referring to FIG. 7A, the first mask M1 is placed on the liquid crystal device 100. Then, a first region 710 of the sub-pixel electrode region is irradiated by a first irradiation UV1, wherein the first region 710 is directly below the first opening 610, and outside of the first region 710 is a second region 720.

Note that the first region 710 is located at a center of the sub-pixel electrode region, and the first region 710 is surrounded by the second region 720.

Furthermore, before the first irradiation UV1, a pre-voltage V0 may be applied to the first flat electrode 112 and the second flat electrode 212 of the sub-pixel electrode region, V0 may be 0 V (no applied voltage) or larger than 0 V. When the voltage is 0 V, the liquid crystal molecules are perpendicular to the first substrate 110 or the second substrate 210. Thus, an angle between the liquid crystal molecules in first region 710 and the substrate is about 90 degree. When the voltage is larger than 0 V, an angle between the liquid crystal molecules and the substrate is smaller than 90 degree, and specifically an angle between the liquid crystal molecules and the substrate is smaller than 90 degree on the first region 710.

The reactive monomers in the first region 710 are polymerized due to the first irradiation UV1, and thus the polymerized region and non-polymerized region have different anchoring energy.

Figure 7B:
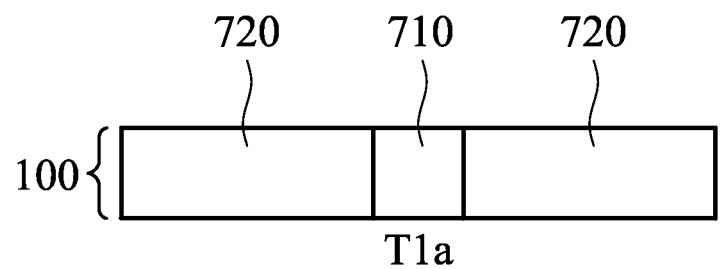

After the first irradiation UV1, the applied voltage is decreased from V0 to 0 V, and a pretilt angle of the first region 710 is T1$a$, as shown in FIG. 7B.

Figure 7C:
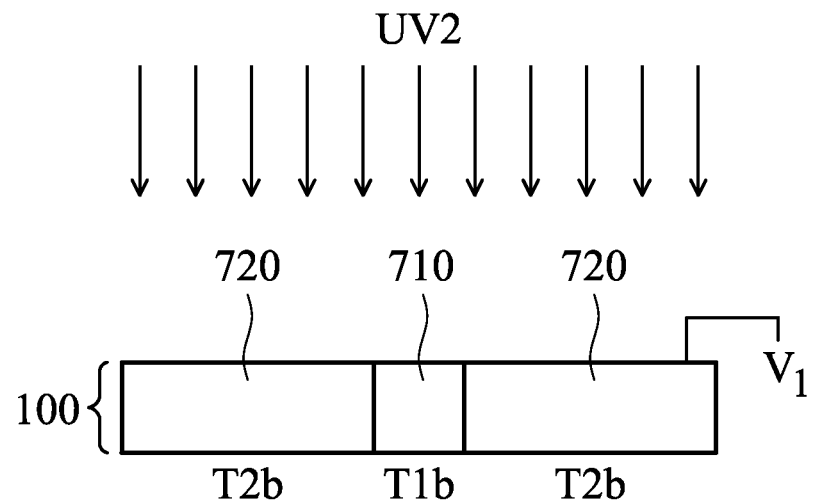

Then, referring to FIG. 7C, a first voltage V1 is applied at a rate of 0.5 V/sec, preferably 0.1 V/sec, to the first flat electrode 112 and second flat electrode 212 of the sub-pixel electrode region. The liquid crystal molecules tilt towards the center of the sub-pixel electrode region due to the oblique field effect. Additionally, the liquid crystal molecules 151 twist to a right side or left side due to the chiral molecules, and thus a continuously deformed alignment structure is shown (like shown in FIGS. 5A and 5B).

The first voltage V1 may be the same as or different from the pre-voltage V0. In a preferred embodiment, the first voltage V1 is not equal to the pre-voltage V0. Additionally, after applying the first voltage V1, the pretilt angle of first region 710 is changed from T1$a$ to T1$b$, and a pretilt angle of the second region 720 is T2$b$.

Referring to FIG. 7C again, the first region 710 and the second region 720 are irradiated by a second irradiation UV2. The monomers in the second region 720 and un-reacted monomers in the first region 710 are polymerized by the second irradiation UV2. The energy of the second irradiation UV2 may be the same as or different from the first irradiation UV1. The energy and irradiation time of the first irradiation UV1 and the second irradiation UV2 may be adjusted according to the actual application by those skilled in the art.

Figure 7D:
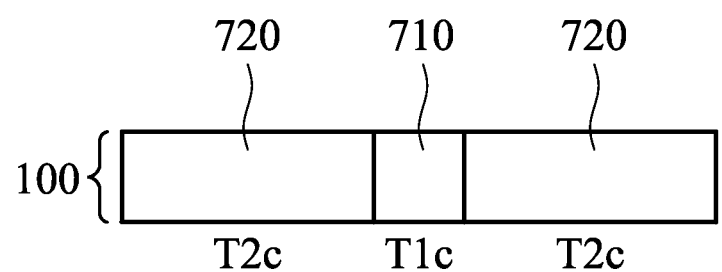

Then, referring to FIG. 7D, after removing the second irradiation UV2 and the first voltage V1, the pretilt angle of the first region 710 becomes T1$c$, and the pretilt angle of the second region 720 becomes T2$c$.

The liquid crystal molecules 151 create a continuous deformation during the polymerization process, and thus a transition zone is formed between the first region 710 and the second region 720. The transition zone shows a graduated pretilt angle which is gradually changed from the first pretilt angle T1$c$ of the first region 710 to the second pretilt angle T2$c$ of the second region 720, but the graduated pretilt angle is not shown in FIG. 7D.

Figure 8A:
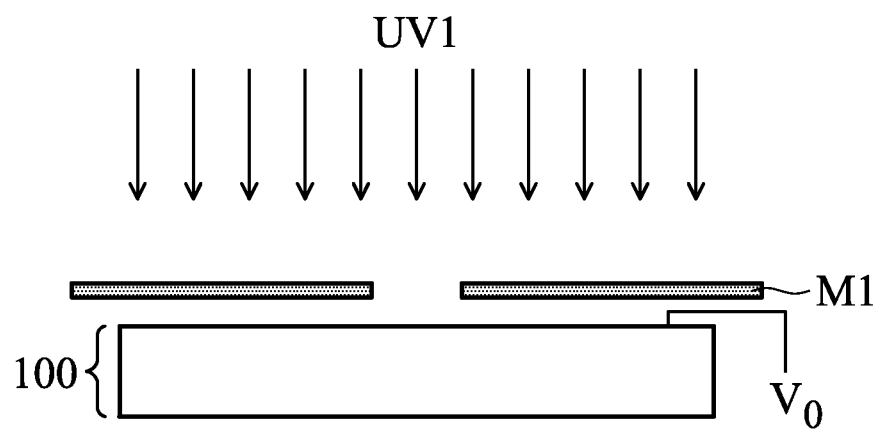
FIGS. 8A-8F show a series of cross-sectional structures illustrating the steps of the fabrication method of a second embodiment.

FIGS. 8A-8F show a series of cross-sectional structures illustrating the steps of the fabrication method of a second embodiment. In FIG. 8A, a first mask M1 is provided on the liquid crystal device 100. Then, a first region 810 of the sub-pixel region is irradiated by a first irradiation UV1, wherein the first region 810 is directly below the first opening 610.

After the first irradiation UV1, the reactive monomers in the first region 810 are polymerized due to the first irradiation UV1, and thus the polymerized region and non-polymerized region has different anchoring energy.

Furthermore, before the first irradiation UV1, a pre-voltage V0 may be applied to the first flat electrode 112 and the second flat electrode 212 of the sub-pixel electrode region, V0 may be 0 V (no applied voltage) or larger than 0 V.

Figure 8B:
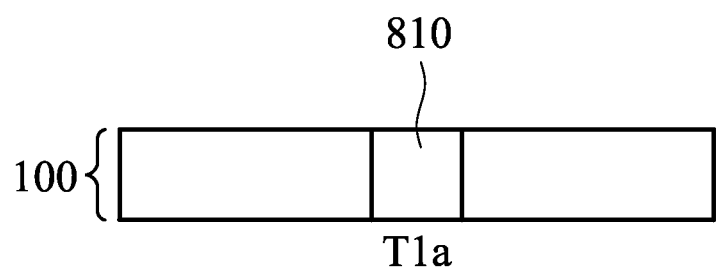

After the first irradiation UV1, the applied voltage is decreased from V0 to 0 V. Referring to FIG. 8B, a pretilt angle of a first region 810 is T1$a$.

Figure 8C:
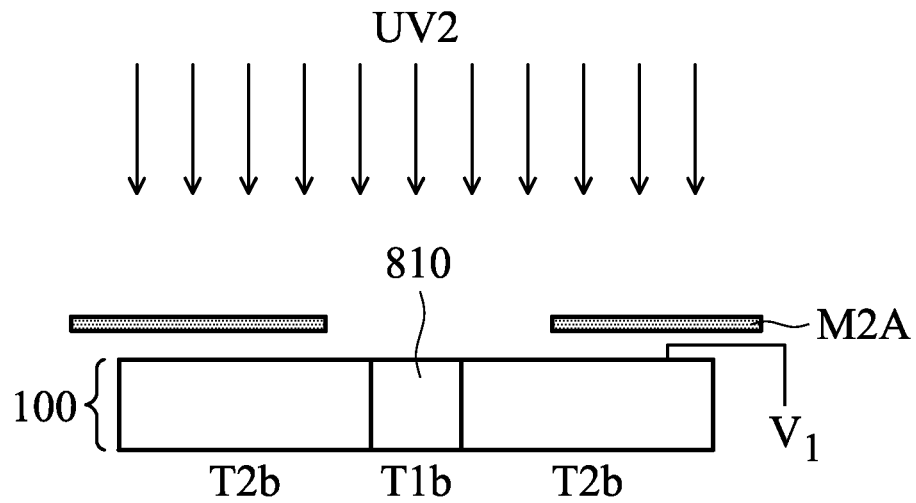

Then, referring to FIG. 8C, a first voltage V1 is applied at a rate of 0.5 V/sec, preferably 0.1 V/sec, to the first flat electrode 112 and second flat electrode 212 of the sub-pixel electrode region. The liquid crystal molecules tilt towards the center of the sub-pixel electrode region due to the oblique field effect. Additionally, the liquid crystal molecules 151 twist to a right side or left side due to the chiral molecules, and thus a continuously deformed alignment structure is shown. (like shown in FIGS. 5A and 5B)

The first voltage V1 may be the same as or different from the pre-voltage V0. In a preferred embodiment, the first voltage V1 is not equal to the pre-voltage V0. Additionally, after applying the first voltage V1, the pretilt angle of first region 810 is changed from T1$a$ to T1$b$, and a pretilt angle of a region outside the first region 810 is T2$b$.

Referring to FIG. 8C again, the second mask M2A is placed on the liquid crystal device 100 to perform a second irradiation UV2. A diameter of the second opening 620 of the second mask M2A is larger than that of the first opening 610 of the first mask M1, and a third region 830 is directly below the second opening 620 and outside of the first region 810. The first region 810 and the third region 830 are irradiated by a second irradiation UV2. Thus, the monomers in the third region 830 and un-reacted monomers in the first region 810 are polymerized by the second irradiation UV2. The energy of the second irradiation UV2 may be the same as or different from that of the first irradiation UV1. The energy and irradiation time of the first irradiation UV1 and second irradiation UV2 may be adjusted according to the actual application to those skilled in the art.

Figure 8D:
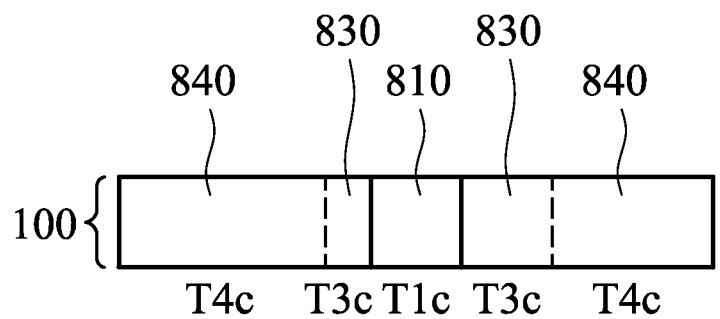

Then, referring to FIG. 8D, after removing the second irradiation UV2 and the first voltage V1, the pretilt angle of the first region 810 becomes T1$c$, and a pretilt angle of the third region 830 becomes T3$c$. A fourth region 840 is outside of the first region 810 and the third region 830 and the fourth region 840 has a pretilt angle of T4$c$.

Figure 8E:
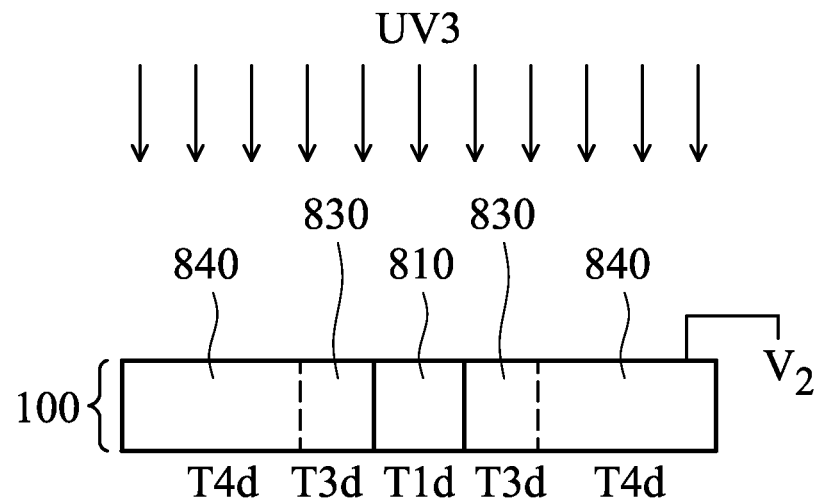

Referring to FIG. 8E, after removing the first voltage V1, a second voltage V2 is applied. The second voltage V2 may be the same as or different from the first voltage V1. In one embodiment, the second voltage V2 is preferably different from the first voltage V1.

After applying the second voltage V2, the pretilt angle of the first region 810 is T1$d$, the pretilt angle of the third region 830 is T3$d$, and the pretilt angle of the fourth region 840 is T4$d$.

In FIG. 8E, a third irradiation UV3 is performed to the whole sub-pixel electrode region, and thus the monomers in the whole sub-pixel electrode region are polymerized. The energy of the third irradiation UV3 may be the same as or different from that of the second irradiation UV2. The energy and irradiation time of the first irradiation UV1, second irradiation UV2 and the third irradiation UV3 may be adjusted according to the actual application to those skilled in the art.

Figure 8F:
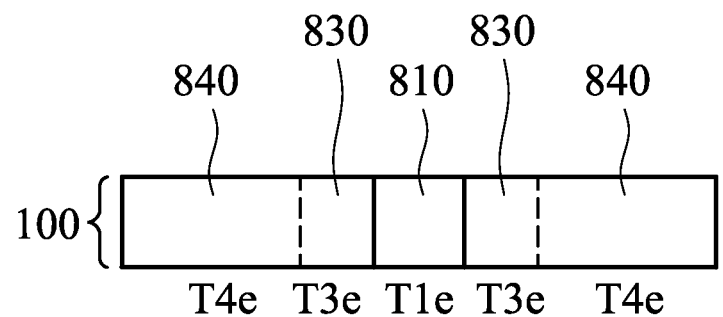

Referring to FIG. 8F, after removing the third irradiation UV3 and the second voltage V2, the pretilt angle of the first region 810 is T1$e$, the pretilt angle of the third region 830 is T3$e$, and the pretilt angle of the fourth region 840 is T4$e$.

FIGS. 9A-9F show a series of cross-sectional structures illustrating the steps of the fabrication method of a third embodiment. The difference between the second embodiment and the third embodiment is that the third mask M2B is used in the third embodiment instead of the second mask M2A. The third mask M2B has the shielding region 630 and the exposed region 632, and the shielding region 630 has a diameter of D3, and D3 which is larger than diameter D1 of the first opening 610.

Figure 9A:
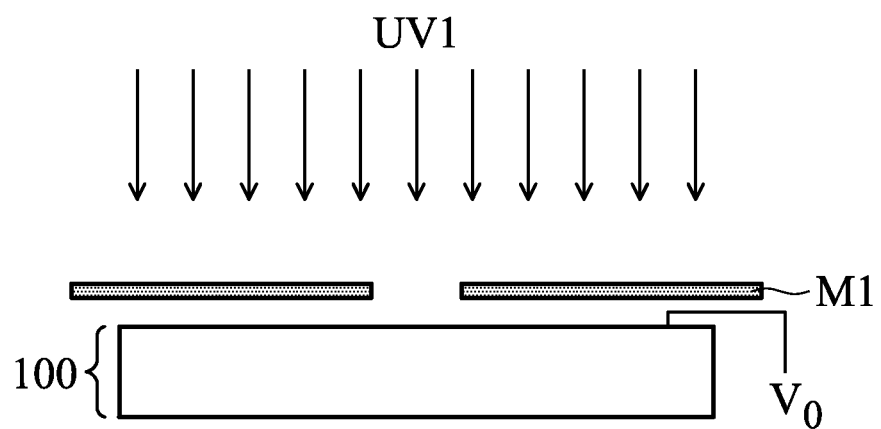
FIGS. 9A-9F show a series of cross-sectional structures illustrating the steps of the fabrication method of a third embodiment.
Figure 9B:
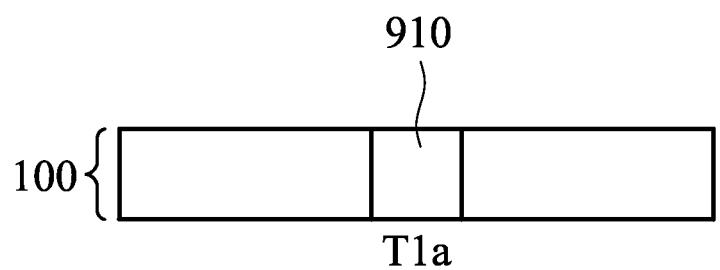

FIGS. 9A-9B is the same as FIG. 8A-8B, and thus are omitted.

Figure 9C:
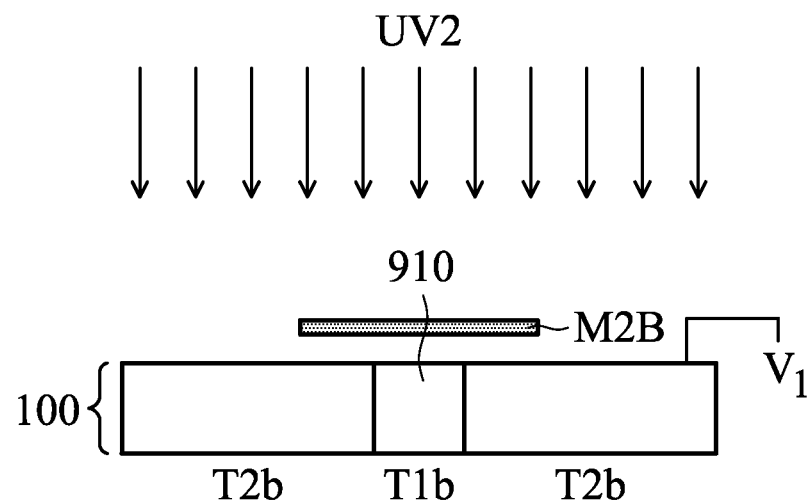

Referring to FIG. 9C, a second irradiation UV2 is performed. A fifth region 950 is directly below the exposed region 632, and a sixth region 960 is outside of the first region 910 and the fifth region 950.

Figure 9D:
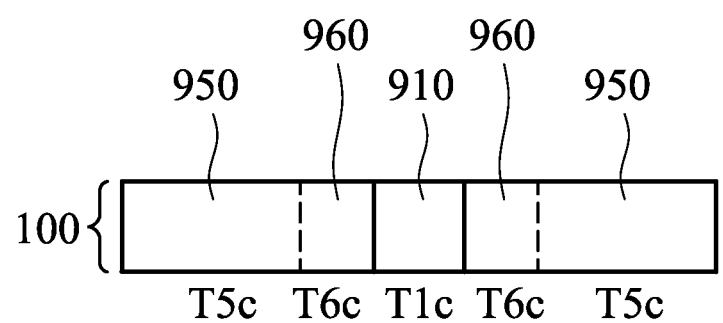

After removing the second irradiation UV2 and the first voltage V1, referring to FIG. 9D, the pretilt angle of the first region 910 is T1$c$, the pretilt angle of the fifth region 950 is T5$c$, and the pretilt angle of the sixth region 960 is T6$c$.

Figure 9E:
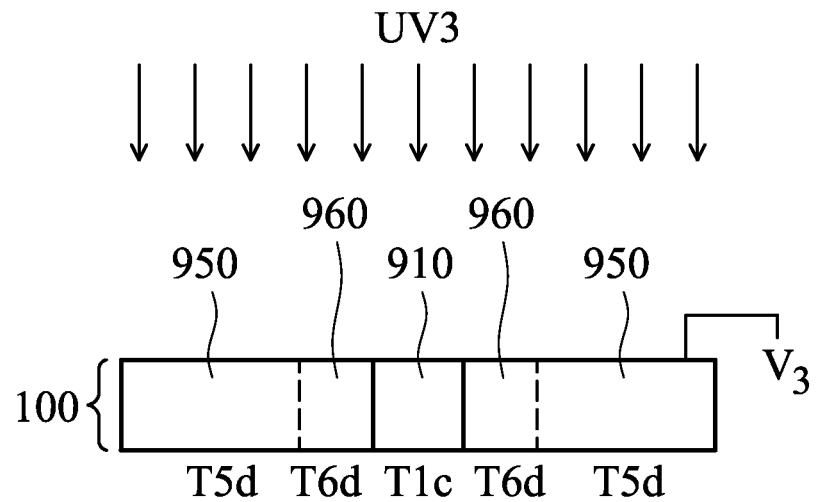
Figure 9F:
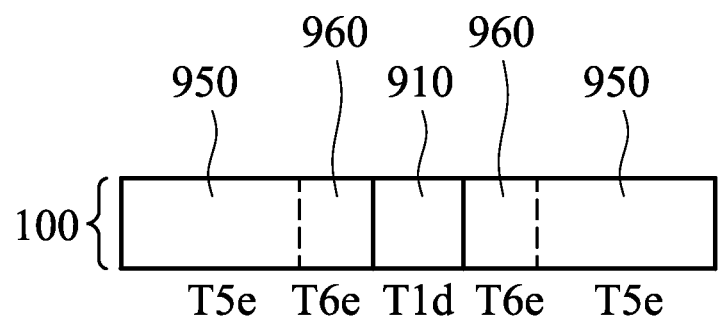

FIGS. 9E-9F are the same as FIG. 8E-8F, and the difference is that a third voltage V3 is used in the third embodiment, and the third voltage V3 may be the same as or different from the second voltage V2.

Note that by applying voltage to the sub-pixel electrode region, the liquid crystal molecules tilt towards the center of the sub-pixel electrode region due to the oblique field effect. Additionally, the liquid crystal molecules twist to a right side or left side due to the chiral molecules, and thus a continuously deformed alignment structure is shown. The polymer stable layer which is helpful for the alignment of the liquid crystal molecules 151 is formed by polymerizing the reactive monomers (RM) by irradiation of light. Thus, by using applied voltages and performing irradiation, the sub-pixel electrode region has a multidomain pretilt angle, and the liquid crystal layer in the sub-pixel electrode region has a continuous domain alignment. In the first embodiment, there are two regions with different pretilt angles, and there are three regions with different pretilt angles in the second and third embodiments.

Moreover, the liquid crystal device 100 further comprises a first polarizer sheet formed on the first substrate 110 and/or a second polarizer sheet formed below the second substrate 210. The first polarizer sheet and the second polarizer sheet may be a linear polarizer sheet.

The above-mentioned liquid crystal device may be used in a transmissive liquid crystal device, transflective or reflective liquid crystal device.

In the above embodiments, the reactive monomers are photoreactive type monomers. Although the monomers are polymerized by irradiation of light in the above embodiment, other methods, such as heating methods, may also be used to polymerize the monomers.

Furthermore, in addition to the reactive monomers, other additives may be added into the liquid crystal layer, such as dye molecules.

While the disclosure has been described by way of example and in terms of the preferred embodiments, it is to be understood that the disclosure is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A liquid crystal display, comprising:
   a substrate, wherein the substrate comprises a first flat electrode formed thereon;
   a first alignment layer formed on the first flat electrode;
   a second substrate disposed oppositely to the first substrate, wherein the second substrate comprises a gate line, a data line and a second flat electrode, wherein the gate line intersects with the data line to define a pixel region, the pixel region comprises at least one sub-pixel electrode region, and an area of the second flat electrode is smaller than that of the first flat electrode;
   a second alignment layer formed on the second flat electrode; and
   a liquid crystal layer formed between the first substrate and the second substrate,
   wherein a distance between a borderline of pixel region and a borderline of the second flat electrode is larger than or equal to a thickness of the liquid crystal layer,
   wherein the sub-pixel electrode region has a multidomain pretilt angle, and wherein the liquid crystal layer in the sub-pixel electrode region has a continuous domain alignment.

2. The liquid crystal display as claimed in claim 1, wherein the liquid crystal layer comprises a nematic liquid crystal molecular and a chiral molecular or a cholesteric molecular.

3. The liquid crystal display as claimed in claim 1, further comprising:
   a polymer stable layer formed on a portion of the first alignment layer or a portion of the second alignment layer.

4. The liquid crystal display as claimed in claim 1, wherein the sub-pixel electrode region comprises a first region and a second region, and a pretilt angle of the first region is different from that of the second region.

5. The liquid crystal display as claimed in claim 4, wherein the first region is located at a center of the sub-pixel electrode region.

6. A liquid crystal display, comprising:
   a substrate, wherein the substrate comprises a first flat electrode formed thereon;
   a first alignment layer formed on the first flat electrode;
   a second substrate disposed oppositely to the first substrate, wherein the second substrate comprises a gate line, a data line and a second flat electrode, wherein the gate line intersects with the data line to define a pixel region, the pixel region comprises at least one sub-pixel electrode region, and an area of the second flat electrode is smaller than that of the first flat electrode;
   a second alignment layer formed on the second flat electrode; and
   a liquid crystal layer formed between the first substrate and the second substrate, wherein the liquid crystal layer has chirality,
   wherein the sub-pixel electrode region comprises a first region, a second region, and a third region, and wherein the first region, the second region, and the third region respectively have a first pretilt angle, a second pretilt angle, and a third pretilt angle, and wherein the first region is surrounded by the second region, and wherein the second region is surrounded by the third region, and
   wherein the first flat electrode overlapped the gate line and the data line.

7. The liquid crystal display as claimed in claim 4, wherein the sub-pixel electrode region further comprises a third region, and a pretilt angle of the first region is different from that of the third region.

8. A method for fabricating a liquid crystal display, comprising:
   providing a first substrate and a second substrate, wherein the first substrate and the second substrate are disposed oppositely to each other;
   forming a first flat electrode on the first substrate;
   forming a first alignment layer on the first flat electrode;
   forming a gate line, a data line and a second flat electrode on the second substrate, wherein the gate line intersects with the data line to define a pixel region, the pixel region comprises at least one sub-pixel electrode region, and an area of the second flat electrode is smaller than that of the first flat electrode;
   forming a second alignment layer on the second flat electrode;
   assembling the first substrate and the second substrate;
   forming a liquid crystal layer between the first substrate and the second substrate, wherein the liquid crystal layer has chirality;
   performing a first irradiation to a first region of the sub-pixel electrode region;
   applying a first voltage to the sub-pixel electrode region;
   performing a second irradiation to the sub-pixel electrode region; and
   removing the first voltage, wherein the liquid crystal layer in the sub-pixel electrode region has a continuous domain alignment.

9. The method for fabricating a liquid crystal display as claimed in claim 8, before performing the first irradiation to the first region of the sub-pixel electrode region, the method further comprising applying a pre-voltage.

10. The method for fabricating a liquid crystal display as claimed in claim 8, wherein the first alignment layer and the second alignment layer comprises reactive monomers (RM).

11. The method for fabricating a liquid crystal display as claimed in claim 8, wherein the liquid crystal layer comprises reactive monomers (RM).

12. The method for fabricating a liquid crystal display as claimed in claim 8, wherein performing the first irradiation to the first region of the sub-pixel electrode region comprises:
   providing a first mask on the sub-pixel electrode region, wherein the first mask has a first opening;
   performing the first irradiation to the sub-pixel electrode region, wherein the first region is directly below the first opening, and outside of the first region is a second region, and a pretilt angle of the first region is different from that of the second region.

13. The method for fabricating a liquid crystal display as claimed in claim 8, wherein performing the second irradiation to the sub-pixel electrode region comprises performing the second irradiation to the first region and the second region of the sub-pixel electrode region.

14. The method for fabricating a liquid crystal display as claimed in claim 8, wherein performing the second irradiation to the sub-pixel electrode region comprises:
   providing a second mask formed on the sub-pixel electrode region, wherein the second mask has a second opening, and a diameter of the second opening is larger than that of the first opening; and
   performing a second irradiation to the sub-pixel electrode region, wherein a third region is directly below the second opening and outside of the first region.

15. The method for fabricating a liquid crystal display as claimed in claim 14, after performing the second irradiation, further comprising:
   applying a second voltage to the sub-pixel electrode region;

performing a third irradiation to the sub-pixel electrode region, wherein a fourth region is outside of the first region and the third region, and a pretilt angle of the first region is different from that of the third region or that of the fourth region.

16. The method for fabricating a liquid crystal display as claimed in claim 8, wherein performing the second irradiation to the sub-pixel electrode region comprises:

providing a third mask formed on the sub-pixel electrode region, wherein the third mask has a shielding region and an exposed region, and a diameter of the shielding region is larger than that of the first opening; and performing a second irradiation to the sub-pixel electrode region, wherein a fifth region is directly below the exposed region.

17. The method for fabricating a liquid crystal display as claimed in claim 16, after performing the second irradiation, further comprising:

applying a third voltage to the sub-pixel electrode region;

performing a third irradiation to the sub-pixel electrode region, wherein a sixth region is outside of the first region and the fifth region.

18. The method for fabricating a liquid crystal display as claimed in claim 16, wherein a pretilt angle of the first region is different from that of the fifth region or that of the sixth region.

19. The liquid crystal display as claimed in claim 1, wherein the liquid crystal layer has chirality.

\* \* \* \* \*